June 21, 1927.
1,633,099
C. HEILMANN
MACHINE ADAPTED TO CATCH AND DESTROY BUGS AND
SIMILAR NOXIOUS VERMIN ON PLANTS AND BUSHES
Filed March 26, 1925  2 Sheets-Sheet 1
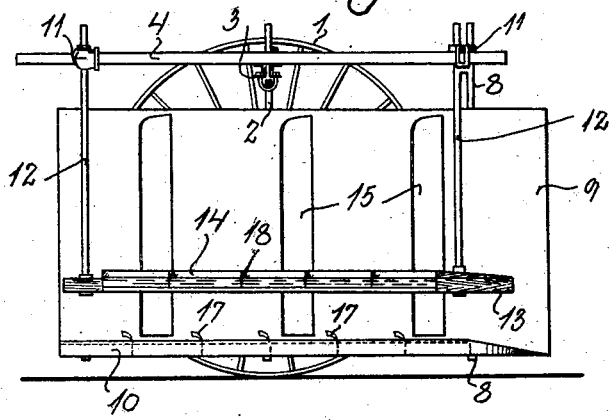
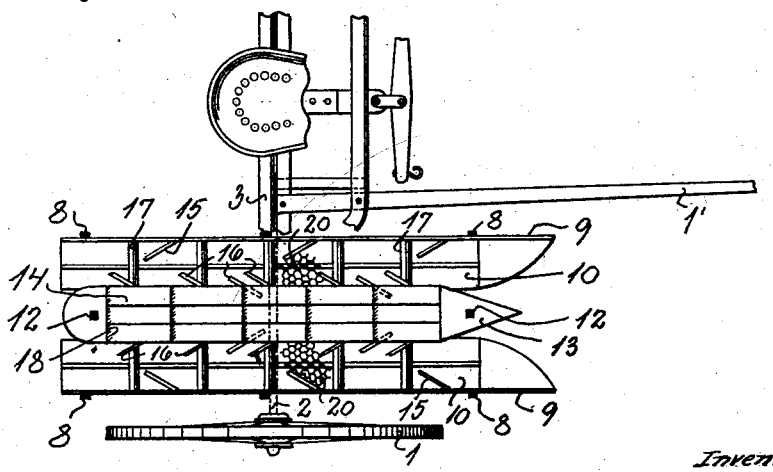
Inventor
Carl Heilmann,
By Watson, Coit, Morse & Grindle,
Att'ys June 21, 1927.
C. HEILMANN
1,633,099
MACHINE ADAPTED TO CATCH AND DESTROY BUGS AND
SIMILAR NOXIOUS VERMIN ON PLANTS AND BUSHES
Filed March 26, 1925  2 Sheets-Sheet 2
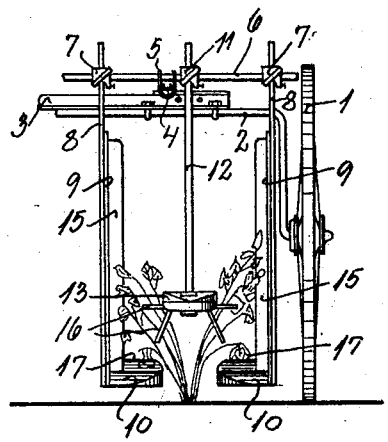
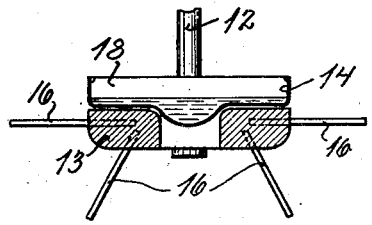
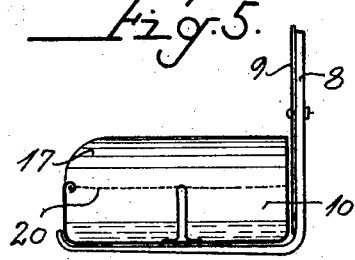
Inventor
Carl Heilmann,
By Watson, Coit, Morse & Grindle,
Att'ys Patented June 21, 1927.

1,633,099

UNITED STATES PATENT OFFICE.

CARL HEILMANN, OF SKELSKOR, DENMARK.

MACHINE ADAPTED TO CATCH AND DESTROY BUGS AND SIMILAR NOXIOUS VERMIN ON PLANTS AND BUSHES.

Application filed March 26, 1925, Serial No. 18,576, and in Denmark August 5, 1924.

Machines are known which are adapted to catch and destroy weevils, beetles, bugs and other noxious vermin on plants and bushes, the said machines being characterized by the provision, between supporting wheels and parallel to the driving direction, of two or more pairs of catching devices consisting each of two vertically and horizontally adjustable catching plates of sheet iron or the like. Such plates being straight, or essentially straight, at bottom and parallel to the driving direction, and fitted with collecting gutters at foot, and every two adjoining plates flaring upwardly away from one another, so as to form warped surfaces, their distance from one another at top increasing in the driving direction.

The essential novel feature of the present invention is that there is adjustably arranged between each pair of the catching plates a long horizontal supplementary catching body tapering towards its front end and having on its upper face a collecting gutter. Said catching body will penetrate the plants or bushes thereby highly increasing the efficiency of the machine without detrimental effect on the plants or bushes.

The invention is illustrated on the drawing, where

Fig. 1 shows, in vertical longitudinal section, one construction of a machine according to the invention, Fig. 2 the right-hand half part of same in top-view, Fig. 3 the machine in end-view, and Figures 4 and 5 are details in cross-section, on a larger scale.

1, 1 (Figs. 1–3) are the wheels of the machine and 1' one of its two carriage poles. The wheels are pivoted on downwardly directed arms 2, bolted to a horizontal frame 3 in such a manner that the distance between the wheels 1 may be varied by adjustment of the said arms. On the frame 3 there are provided two horizontal rails 4, for instance of channel iron, and on each of these rails and close to their end there are attached, adjustably, two loop-shaped clips 5 adapted to be fixed in any desired position on its corresponding rail 4. Each clip 5 supports a horizontal rod 6, for instance of square iron, which is at right angle to the corresponding rail 4.

At both ends of the horizontal rods 6 there is provided a universally adjustable link 7 of known kind, into which there is fastened adjustably a rod 8 supporting a catching plate 9. Inside of each wheel 1 there is thus provided one set of vertically placed catching plates parallel to the driving direction and at bottom fitted with a collecting gutter 10.

The catching plates may be flared at the front end away from one another and the collecting gutters are at their front ends rounded, the distance between their inner ends increasing in the direction of driving. On the rod 6 there are adjustably attached by means of two universally adjustable links 11 of known kind two rods 12 supporting a horizontally arranged catching body 13 placed between the catching plates 9 at a certain height over their collecting gutters 10. The said collecting body 13 is wedge shaped at its front end and carries a collecting gutter 14. The catching plates 9 are provided on their inner faces, with a number of shaking plates 15 or flexible or springy shaking rods the free edges or ends of which face the collecting body 13 and are directed towards the back end of the machine. The collecting body 13 is provided with a number of flexible or springy shaking plates or rods 16 for instance of rattan facing the catching plates 9 and placed in an oblique direction towards the back end of the machine.

The height and the length of the catching plates and the width and vertical adjustment of the collecting gutters and the catching body 13 is varied in conformity to the shape and stature of the plants.

The collecting gutters 10 on the catching plates 9 as well as the gutter 14 on the collecting body 13 are subdivided in a series of compartments by means of transverse partitions 17 and 18 of which the former are bent backward as shown in Fig. 5.

The gutters are covered with the network 20 and a similar network may be used for covering the collecting gutter 14.

The manner of action of the machine is the following:—

The wheels 1 are adjusted in such a manner on the frame 3 that their mutual distance exceeds somewhat the distance between the outsides of the two rows of plants or bushes to be treated, see Fig. 3, whereafter the catching plates 9 are adjusted horizontally as well as vertically by means of the adjusting devices 5—8 in such a manner that the mutual distance between two corresponding plates will be somewhat less than the width of the plants or bushes and that the plates will clear the ground by a suitable distance.

The catching body 13 is then adjusted horizontally as well as vertically by means of the adjustment devices 5, 6, 11 and 12 in such a manner that it will occupy the position shown in Fig. 2 at a suitable height between the collecting gutters 10 and the top of the plants or bushes, as shown in Fig. 3.

The collecting gutters 10 and 14 are filled with oil, petroleum or other adhesive or insect-killing fluid and the machine is then pulled along above two rows of plants or bushes. Hereby the front edges of the two co-operating catching plates 9 will catch the stems or branches of the plants or bushes guiding same into the space between the catching plates 9 so that the said stems or branches will be dragged along the inner faces of said catching plates. The shaking plates or flexible or springy rods 15 attached to the catching plates will co-operate with the corresponding members 16 on the collecting body 13 and thus will catch the stems or branches and force them alternately to both sides, the effect being that the plants or bushes are vigorously shaken without detrimental influence, the weevils and other insects thereby being shaken off and dropped into the collecting gutters 10 and 14.

The arrangement of the collecting body 13 causes that practically no weevils or the like can fall upon the ground but necessarily must fall into one of the collecting gutters. On account of the subdivision of the collecting gutters by means of the transverse plates 17 and 18 they are able to contain fluid in about their entire length even if the ground be not horizontal in the driving direction, and the backwardly bent part of the transverse plates 17 will act upon the lower portion of the plants and bushes, the network 20 preventing the leaves from being dragged through the contents of the collecting gutters.

The invention is not restricted to the manner of execution described and shown on the drawing as many structural details may be altered without departing from the principle of the invention. For instance the horse may push the machine instead of pulling it. This arrangement would involve the advantage that the horse then does not shake off the weevils etc. on the plants and bushes.

Having now particularly described and ascertained the nature of my said invention and in what manner the same is to be performed, I declare that what I claim is:—

1. In a machine for catching and destroying weevils, beetles, bugs and other vermin on plants and bushes growing in rows, the combination of a pair of supporting wheels, a pair of vertical catching plates arranged between the said wheels parallel thereto, a horizontal collecting gutter arranged along the lower edge of each such plate on its side facing the corresponding plate, and between said pair of plates an adjustably supported, long, horizontal catching body, tapering towards its front end and having on its upper face a collecting gutter adapted to separate and pass between the branches of a plant and having on its two side faces shaking rods, said collecting gutters completely covering the ground included between each pair of plates below the foliage on said plants.

2. In a machine for catching and destroying weevils, beetles, bugs and other vermin on plants and bushes growing in rows, the combination of a pair of supporting wheels, two pairs of vertical catching plates arranged between the said wheels parallel to same, a horizontal collecting gutter arranged along the lower edge of each such plate on its side facing the corresponding plate, and between each such pair of plates an adjustably supported, long, horizontal catching body, tapering towards its front end and having on its upper face a collecting gutter and on its two side faces shaking rods, and transverse partitions subdividing the said collecting gutter into a number of compartments, the upper edge of said partitions being bent towards the end of the machine, said collecting gutters completely covering the ground included between each pair of plates below the foliage on said plants.

In testimony whereof I have signed my name to this specification.

CARL HEILMANN.